US012718347B2

(12) United States Patent
Semenov

(10) Patent No.: US 12,718,347 B2
(45) Date of Patent: Aug. 25, 2026

(54) IMAGE PROCESSING METHOD

(71) Applicant: Croda International PLC, East Yorkshire (GB)

(72) Inventor: Alexander Vyacheslavovich Semenov, East Yorkshire (GB)

(73) Assignee: Croda International PLC, East Yorkshire (GB)

( * ) Notice: Subject to any disclaimer, the term of this patent is extended or adjusted under 35 U.S.C. 154(b) by 302 days.

(21) Appl. No.: 18/245,416

(22) PCT Filed: Sep. 3, 2021

(86) PCT No.: PCT/EP2021/074413
§ 371 (c)(1),
(2) Date: Mar. 15, 2023

(87) PCT Pub. No.: WO2022/058184
PCT Pub. Date: Mar. 24, 2022

(65) Prior Publication Data

US 2023/0360191 A1 Nov. 9, 2023

(30) Foreign Application Priority Data

Sep. 18, 2020 (GB) ..................................... 2014775

(51) Int. Cl.
*G06T 7/00* (2017.01)
*G06T 7/11* (2017.01)

(52) U.S. Cl.
CPC .............. *G06T 7/0008* (2013.01); *G06T 7/11* (2017.01); *G06T 2200/28* (2013.01);
(Continued)

(58) Field of Classification Search
CPC ..... G06T 7/0008; G06T 7/11; G06T 2200/28; G06T 2207/20081; G06T 2207/20084; G06T 2207/30128; G06T 7/0004
See application file for complete search history.

(56) References Cited

U.S. PATENT DOCUMENTS

2004/0141641 A1 7/2004 McDonald et al.
2011/0258924 A1 10/2011 Van Asbrouck et al.
(Continued)

FOREIGN PATENT DOCUMENTS

CN 103090818 A 5/2013
CN 108593663 A 9/2018
(Continued)

OTHER PUBLICATIONS

Office Action issued in related Canadian Patent Application No. 3,195,500, dated Feb. 24, 2025.
(Continued)

*Primary Examiner* — Bobbak Safaipour
(74) *Attorney, Agent, or Firm* — Honigman LLP; Brett A. Krueger

(57) ABSTRACT

A method for processing images of seeds, the method comprising: inputting a seed image comprising at least a portion of a seed to a trained neural network to generate a value associated with the coverage of a coating on the seed; the trained neural network having been trained to generate a value associated with the coverage of coating on the seed using a plurality of training images each comprising at least a portion of a training seed, and wherein each training image is labelled with a value associated with the coverage of a coating on the training seed.

15 Claims, 11 Drawing Sheets

S102
inputting a seed image comprising at least a portion of a seed to a trained neural network to generate a value indicative of the coverage of a coating on the seed S100
training a neural network to generate a trained neural network to generate a value indicative of the coverage of coating on the seed using a plurality of training images each comprising at least a portion of a training seed, and wherein each training image is labelled with a value indicative of the coverage of a coating on the training seed S102
inputting a seed image comprising at least a portion of a seed to the trained neural network to generate a value indicative of the coverage of a coating on the seed

(52) U.S. Cl.
CPC ............... *G06T 2207/20081* (2013.01); *G06T 2207/20084* (2013.01); *G06T 2207/30128* (2013.01)

(56) References Cited

U.S. PATENT DOCUMENTS

2013/0194410 A1* 8/2013 Topman ................. G06V 20/69
382/133
2015/0178948 A1 6/2015 Schnier et al.
2020/0293814 A1* 9/2020 Shniberg .............. G06V 10/143
2020/0367422 A1* 11/2020 Shniberg ................. G06T 7/001
2022/0284232 A1* 9/2022 Yin ...................... G06V 30/194
2025/0052673 A1* 2/2025 Ide ......................... G01N 21/84

FOREIGN PATENT DOCUMENTS

CN 208270444 U 12/2018
CN 110501983 A 11/2019
CN 111639459 A 9/2020
JP H04-140649 A 5/1992
JP 2002-538792 A 11/2002
WO 2007136546 A2 11/2007
WO 2012035504 A1 3/2012

OTHER PUBLICATIONS

Haoguang Li et al, "Single Coated Maize Seed Identification Based on Deep Learning", 2018 13th IEEE Conference on Industrial Electronics and Applications (ICIEA), IEEE,May 31, 2018 (May 31, 2018), pp. 1520-1525.
Robert P Cogdill et al, "Single-Kernel Maize Analysis by Near-Infrared Hyperspectral Imaging", Transactions of the ASAE, vol. 47, Jan. 1, 2004 (Jan. 1, 2004), pp. 311-320.
Cosima Hirschberg et al, "Image-Based Artificial Intelligence Methods for Product Control of Tablet Coating Quality", Pharmaceutics, vol. 12, No. 9, Sep. 15, 2020 (Sep. 15, 2020), p. 877.
International Search Report, Application No. PCT/EP2021/074413, mailed Jan. 5, 2022. ISA/European Patent Office.
Office Action issued in related Japanese Patent Application No. 2023-516816 mailed on Aug. 8, 2025.
Office action issued in related Canadian Patent Application No. 3,195,500, mailed on Nov. 25, 2025.
Search Report issued in related Chinese Patent Application No. 2021800766748, mailed on Dec. 18, 2025.
Office action issued in related Chinese Patent Application No. 2021800766748 mailed on Dec. 22, 2025.
Haouguang, Li et al. "Identification of Coated Single-Grain Maize Varieties Based on Stacked Autoencoder Neural Networks." Transactions of the Chinese Society for Agricultural Machinery, vol. 48, No. S1, pp. 422-428, Dec. 2017.

* cited by examiner

S102 inputting a seed image comprising at least a portion of a seed to a trained neural network to generate a value indicative of the coverage of a coating on the seed

Fig. 1a

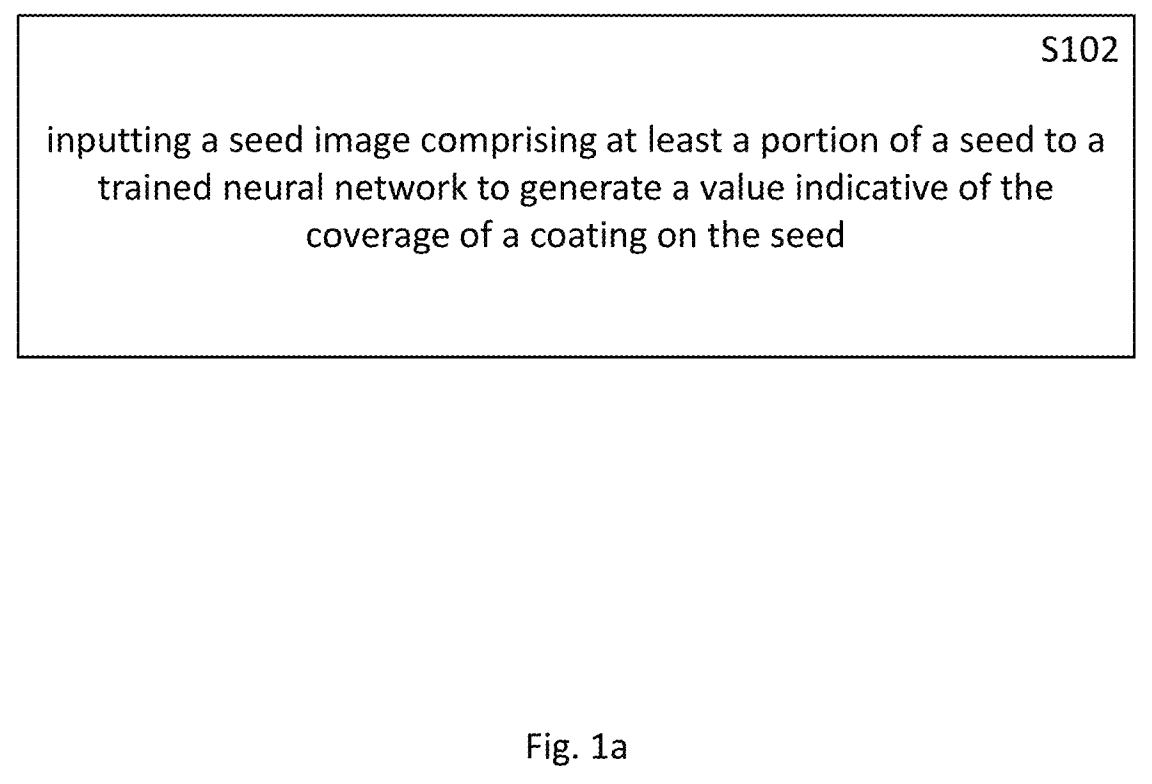

S100 training a neural network to generate a trained neural network to generate a value indicative of the coverage of coating on the seed using a plurality of training images each comprising at least a portion of a training seed, and wherein each training image is labelled with a value indicative of the coverage of a coating on the training seed

S102 inputting a seed image comprising at least a portion of a seed to the trained neural network to generate a value indicative of the coverage of a coating on the seed

Fig. 1b 214
212
210

IMAGE PROCESSING METHOD

CROSS-REFERENCE TO RELATED APPLICATIONS

This application is the U.S. national stage of PCT/EP2021/074413 filed on Sep. 3, 2021, which claims priority of United Kingdom Patent Application No. GB 2014775.7 filed on Sep. 18, 2020, the contents of which are incorporated herein.

TECHNICAL FIELD

The present disclosure relates to a method of processing images of seeds and is particularly, although not exclusive, concerned with a method of processing images of seeds comprising a coating.

BACKGROUND

Seeds for use in agriculture are often coated. The coatings may be provided for a variety of reasons. It is common to provide seeds with a coating to protect the seeds from damage during handling, to prevent dust and for cosmetic appearance. Such coatings may also provide the advantages of protecting the seeds from pest attacks and diseases, and smoothing the seed surface to make planting easier. In order to control the seed germination, or the germination rate, plant nutrients or other growth stimulating agents can be incorporated into the seed coating. Plant protecting agents, such as pesticides (e.g. fungicides and insecticides), may be incorporated to further protect the seed from disease and/or pest attack.

Seeds are often subject to mechanical stress, particularly during processing. Therefore, the coatings on seeds are also subject to mechanical stress. It is beneficial for coatings on seeds to be resistant to the abrasion resulting from the mechanical stress so that the seeds remain sufficiently coated, so that the coating can perform it's intended function, so that the seed is visible in soil and/or so that the coating remains a visible means of identification of the seed type and its particular coating.

Abrasion resistance is an ability of a coating to be resistant to mechanical stress and is a metric by which the quality of film coatings on seeds may be assessed. Visual inspection of seeds may be used to determine the abrasion resistance of coatings on seeds, in particular by assessing how coated a seed is after the seed has been subject to abrasion. However, such methods may be subjective due to many random factors which cannot be properly controlled (e.g. personal preferences, light or visual references) resulting in a high variation even within same samples. It is desirable to develop methods to assess the abrasion resistance of coatings with higher accuracy and consistency.

SUMMARY

According to an embodiment of one aspect of the disclosure, there is provided a method for processing images of seeds, the method comprising: inputting a seed image comprising at least a portion of a seed to a trained neural network to generate a value associated with the coverage of a coating on the seed; the trained neural network having been trained to generate a value associated with the coverage of coating on the seed using a plurality of training images each comprising at least a portion of a training seed, and wherein each training image is labelled with a value associated with the coverage of a coating on the training seed.

The value associated with the coverage of the coating on the seed may indicate the resistance of the coating to abrasion. The value associated with the coverage of the coating on the seed/training seed may indicate the percentage of the seed surface covered in a coating. The value associated with the coverage of the coating on the seed may indicate the uniformity of the coverage of the coating on the seed. The value associated with the coverage of a coating on the seed may comprise an indication of how uniformly the seed surface is coated in a coating and/or how much of a surface of a seed is covered in the coating. The amount that a surface is covered by a coating may indicate the abrasion resistance of a coating. For example, if coated seeds have been exposed to mechanical stress, the amount of the coating remaining may indicate the abrasion resistance of the coating, or the thickness of the coating may indicate the abrasion resistance of the coating.

The method may further comprise the step of training the neural network. The trained neural network may be trained or have been trained using first training images of training seeds comprising a coating of a first colour, and using second training images of training seeds comprising coatings of a second colour. The step of inputting may comprise inputting a seed image of a seed comprising a coating of the first colour.

The seed image may be generated by extracting a region of a seed from an image comprising a plurality of seeds. The region of the seed may be extracted using an algorithm to detect circles in images to detect an area within the seed, where the area within the seed is then extracted.

The training image may be generated by extracting a region of a training seed from an image comprising a plurality of training seeds. The region of the training seed may be extracted using an algorithm to detect circles in images to detect an area within the training seed, where the area within the training seed may then be extracted.

A plurality of seed images may be generated from the same image or taken from the same sample (for example, the same seed or the same sample comprising a plurality of seeds). The sample may be a sample comprising a plurality of seeds which have been coated in substantially the same amount (and type) of coating and exposed to substantially the same amount of mechanical stress. These images may be input to the trained neural network to generate a plurality of values associated with the coverage of a coating corresponding to the seed images. An average of the plurality of values may be taken.

The neural network may be at least one of: a convolutional neural network; and a deep neural network. The neural network may comprise at least one of (each of): an input layer, a 2D convolution layer, a batch normalization layer, a ReLU layer, a max pooling layer, a fully connected layer, and a regression layer.

According to an embodiment of one aspect of the disclosure, there is provided a computer program which, when executed by a computing system comprising processor hardware and memory hardware, causes the processor hardware to perform any of the methods described herein.

According to an embodiment of one aspect of the disclosure, there is provided an apparatus comprising processor hardware and memory hardware, the memory hardware storing processing instructions which, when executed by the processor hardware, cause the processor hardware to perform any of the methods described herein.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

BRIEF DESCRIPTION OF THE DRAWINGS

For a better understanding of the present disclosure, and to show more clearly how it may be carried into effect, reference will now be made, by way of example, to the accompanying drawings, in which:

FIG. 1*a* is a flow chart of a method according to an example;

FIG. 1*b* is a flow chart of a method according to an example;

DETAILED DESCRIPTION OF PREFERRED EMBODIMENTS

Figure 2:
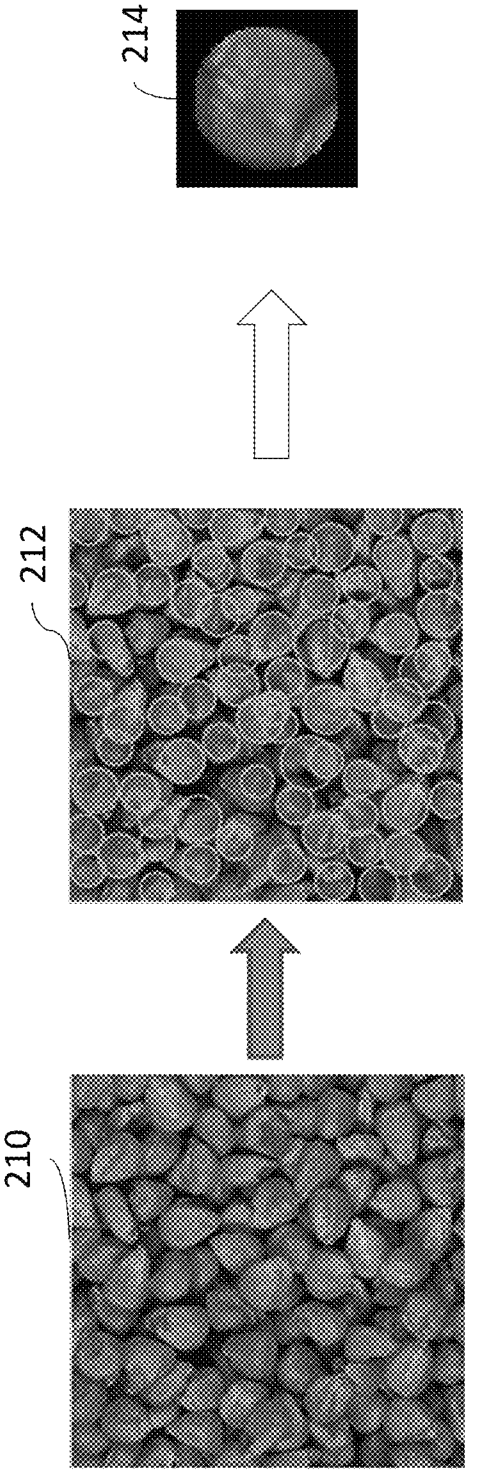
FIG. 2 is an illustration of the images involved in an image processing method according to an example.
Figure 2:

Coatings for seeds are generally coloured in order to indicate that the seeds have been treated. The particular colour of the coating may indicate the composition of the coating. Alternatively, the colour may be selected to make seeds more visible in soil. Blue coatings are less visible in soil, whereas red coatings are more visible. Seeds may also be coated in a colour that makes them less attractive to animals. Field crops, such as corn or sunflowers, are generally coated in a red or blue coatings.

The coloured coating on seeds is useful in determining the abrasion resistance of the coating (or the resistance of the coating to being removed from a seed, or displaced, when subject to mechanical stress), as the contrast of the coloured coating with the colour of the untreated seed may be used in order to determine the coverage and/or thickness of the coating on the seed. It is therefore possible to visually inspect seeds and assign a value to the seeds indicating the coverage of the coating on the seed, and thereby indicating the resistance of the coating to abrasion and/or the percentage of the seed surface covered in the coating. The value associated with the coverage of a seed may indicate how uniformly the seed surface is coated in a coating and/or how much of a surface of a seed is covered in the coating. The amount that a surface is covered by a coating and/or the thickness of the coating may indicate the abrasion resistance of a coating.

The abrasion resistance of coatings on seeds may be tested by subjecting coated seeds to mechanical stress. Abrasion of the coating on seeds may be achieved, for example, by placing at least one seed in a wheel (drum, carousel) and turning this wheel for a certain amount of time and/or number of revolutions. The wheel may turn in a vertical plane around a horizontal axis. Alternatively, the wheel may turn in a horizontal plane around a vertical axis. Any suitable apparatus for exerting mechanical stress on seeds may be used. For example, an abrasion test machine may be used. Examples of such machines comprise models PTF 200, PTF 20E or PTF 20ER from PharmaTest (typically used to test the friability or abrasion of pharmaceutical tablets but are equally usable with seeds). After that, the abrasion may be assessed visually by assessing how much of the coloured coating remains, and a value within a range may be attributed to the coating. The coating may have been completely removed from the seed surface, or the thickness of the coating may have been reduced (which may result in a colour or shade of coating different to the shade or colour of coating at full thickness). Abrasion of the seeds (or exposure of the seeds to mechanical stress) may not only cause a loss of material in the means of reduction of layer thickness or parts of coating being removed. It may also cause displacement of coating to other parts of the seeds. This may result in some regions of the coating becoming thinner or being entirely removed, while in other regions the coating layer thickness may increase. This may cause more uneven coverage which cannot be measured using methods such as weight measurements, but can be measured by assessing the thickness of the coating. Therefore, the abrasion resistance of a coating may be determined by assessing the thickness of a coating on a seed which has been exposed to mechanical stress. The lower value of the range may indicate no abrasion (high coverage of the coating), and the upper value of the range may indicate that most of the coating has been removed. For example, a number between zero (no abrasion/generally full coverage of coating) and five (hardly any coating left) may be assigned to the seed or coating.

However, visual inspection of seeds may be relatively subjective due to random factors which cannot be properly controlled (e.g. personal preferences, light or visual references), potentially resulting in a high variation in the determined abrasion resistance even within the same samples.

In an example, there is provided a method for processing images of seeds, the method comprising inputting a seed image comprising at least a portion of a seed to a trained neural network to generate a value associated with (or associated with) the coverage of a coating on the seed. The trained neural network is a neural network having been trained to generate a value associated with the coverage of coating on the seed using a plurality of training images each comprising at least a portion of a training seed, and wherein each training image is labelled with a value associated with the coverage of a coating on the training seed. Such a method is outlined in FIG. 1*a*, which outlines the step of inputting a seed image comprising at least a portion of a seed to a trained neural network to generate a value associated with the coverage of a coating on the seed.

Figure 1B:
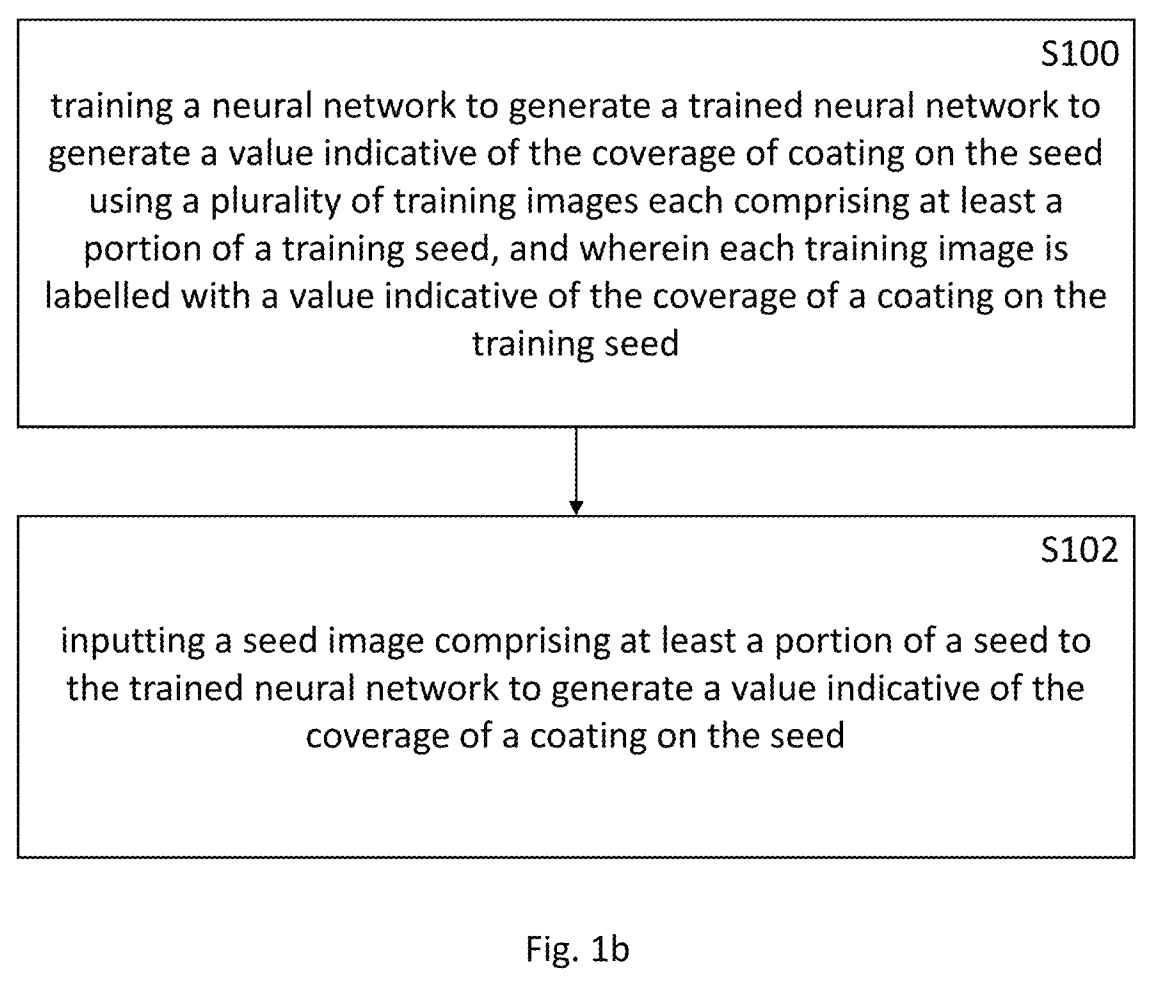

The method may comprise the training of the neural network. Such a method is outlined in FIG. 1*b*. Thus, the method may comprise training a neural network to generate a trained neural network to generate a value associated with the coverage of coating on the seed using a plurality of training images each comprising at least a portion of a training seed, and wherein each training image is labelled with a value associated with the coverage of a coating on the training seed (S100). A seed image comprising at least a portion of a seed may then be input to the trained neural network to generate a value associated with the coverage of a coating on the seed (S102).

The determined coverage may indicate the percentage of the seed surface that is covered in a coating (compared to the percentage of the seed surface that has no, or substantially no, coating). The determined coverage may indicate how uniformly the coating has been applied onto the seed surface during the coating process. The determined coverage may indicate uniformity of the (thickness of the) coating (e.g. after being exposed to mechanical stress). The determined coverage may indicate the abrasion resistance of a coating. As discussed above, abrasion resistance is an ability of a coating to be resistant to mechanical stress. The abrasion resistance of the coating on seeds may be tested by exposing the seeds to mechanical stress and determining how much of the coating is removed (the amount of coating removed may be the amount of coating completely, or substantially completely, removed, and/or may include the amount of a reduction (or increase) in the thickness of the coating). Therefore, the determined coverage (e.g. a percentage coverage, reduction (or increase) in thickness, etc.) of a coating on the seed after a seed has been exposed to mechanical stress may indicate the resistance of the coating to abrasion (abrasion resistance). For example, the value associated with the coverage of coating on the seed may be associated with the abrasion resistance of the seed.

Images of (surfaces of) seeds which have been abraded may be taken for use in the method. For example, seeds of a sample may be placed in a wheel and this wheel turned for a certain time or number of revolutions, thereby exposing the seeds to mechanical stress. Images of the seeds may then be taken using a camera or scanner or any other image extracting means.

For images generated for training (training images), different times or number of revolutions for turning of the wheel may be used for the same type of seed with the same type of coating, so that a variety of seed coverage is achieved. Images of seeds that have been treated in this manner may then be taken resulting in images of seeds with varying coverage of coating. Images may also be taken of the same type of seeds which have been coated and not exposed to mechanical stress, and seeds which are raw (uncoated). The images of seeds used in the training may be images showing seeds with varying levels of coverage, and may include coated seeds which have not been exposed to mechanical stress, coated seeds which have been exposed to mechanical stress, and/or raw seeds which have no coating. The images may also be images of varying quality, resolution and/or light intensity. These images may be used as the training images (e.g. training data) for training the neural network. A number of training images may be set aside for a validation of the method (validation images), e.g. to check that the trained neural network is assigning correct values of coverage/abrasion resistance to images.

Additionally, such images may be taken of seeds with a coating for which the abrasion resistance is to be determined. These images (seed images) may be input to the trained neural network. To determine the abrasion resistance of a coating, it may be desirable to establish a set time or number of revolutions that a sample of seeds coated with a coating are turned in a wheel, so that different samples of seeds (the same type of seed) having different coatings are subject to substantially the same mechanical stress, and therefore the results for different types of coatings (on the same type of seed) are comparable.

Images taken of seeds may be initial images comprising a plurality of seeds. These initial images may be used as input to the neural network or trained neural network. Alternatively, data on individual seeds in the initial images may be extracted. For example, images of single seeds, or a portion of a single seed, may be extracted from the initial images. This is further beneficial as an initial image may comprise a number of individual seeds, and therefore by extracting the individual seeds, the number of training data which can be input to the neural network can be increased. Furthermore, in order to determine the coverage of a coating, images of portions of individual seeds may be grouped based on the sample (e.g. seeds coated with the same type of coating, from the same batch of seeds coated in a coating) they have been produced from and an average value of the values indicating the coverage may be taken. For example, images of individual seed portions taken from the same initial image, or the same sample, may be processed by the neural network to each provide a value of abrasion resistance which is then averaged to generate an average value associated with the coverage of the coating per sample. This may provide a more accurate value of abrasion resistance of a particular coating.

A computer implemented image processing method may be used to extract data on the seeds in the image. For example, seeds (such as corn and tomato etc.) tend to have a generally circular or elliptical shapes, so a Circular Hough Transform (CHT) based algorithm for finding circles in images may be applied to identify radii and centre coordinates for the seeds in the initial image. The perimeter of the circle may be tangential to edges of the seed. Thus, the circle may be within the perimeter of the seed. Alternatively, the circle may incorporate an overlap region of the seed, where the circle overlaps at least a portion of the seed. It is noted that this method may be applied to any type of seed to identify a region within a seed. These identified regions may then be extracted. This approach is beneficial because of its robustness in the presence of noise, occlusion and varying illumination of the seeds. This extraction method may also apply to seed images to be input to the trained neural network to determine the coverage of coating on the seed. The result of this method is illustrated in FIG. 2.

FIG. 2 illustrates an image of corn 210 which has been coated (in a red coating) and exposed to mechanical stress as described above. In the examples described herein, the seeds used are corn, however, it will be appreciated that the method will be applicable to images of any type of seeds and/or colour of coating. The method above for extracting regions of individual seeds is applied to the image of corn 210, and a processed image 212 is produced, in which regions which are detected as belonging to individual seeds are indicated by a circle. Each of the individual seed portions (or a set of the individual seeds portions) are then extracted. FIG. 2 illustrates an example of an extracted individual seed region 214. In particular, the circular regions indicated in the processed image 212 have been extracted and are images of portions of individual seeds. Any number of the extracted regions may be used in training the neural network or as input to the trained neural network.

With the processing of the initial images in this manner, a plurality of individual seed portion images may be generated for use as training images. In an example, by processing the 500 initial images in this way, around 30,000 images of individual seeds may be generated and may be used for training and validation (in such a set, 10% of the images may be set aside for validation of the method).

Figure 3:
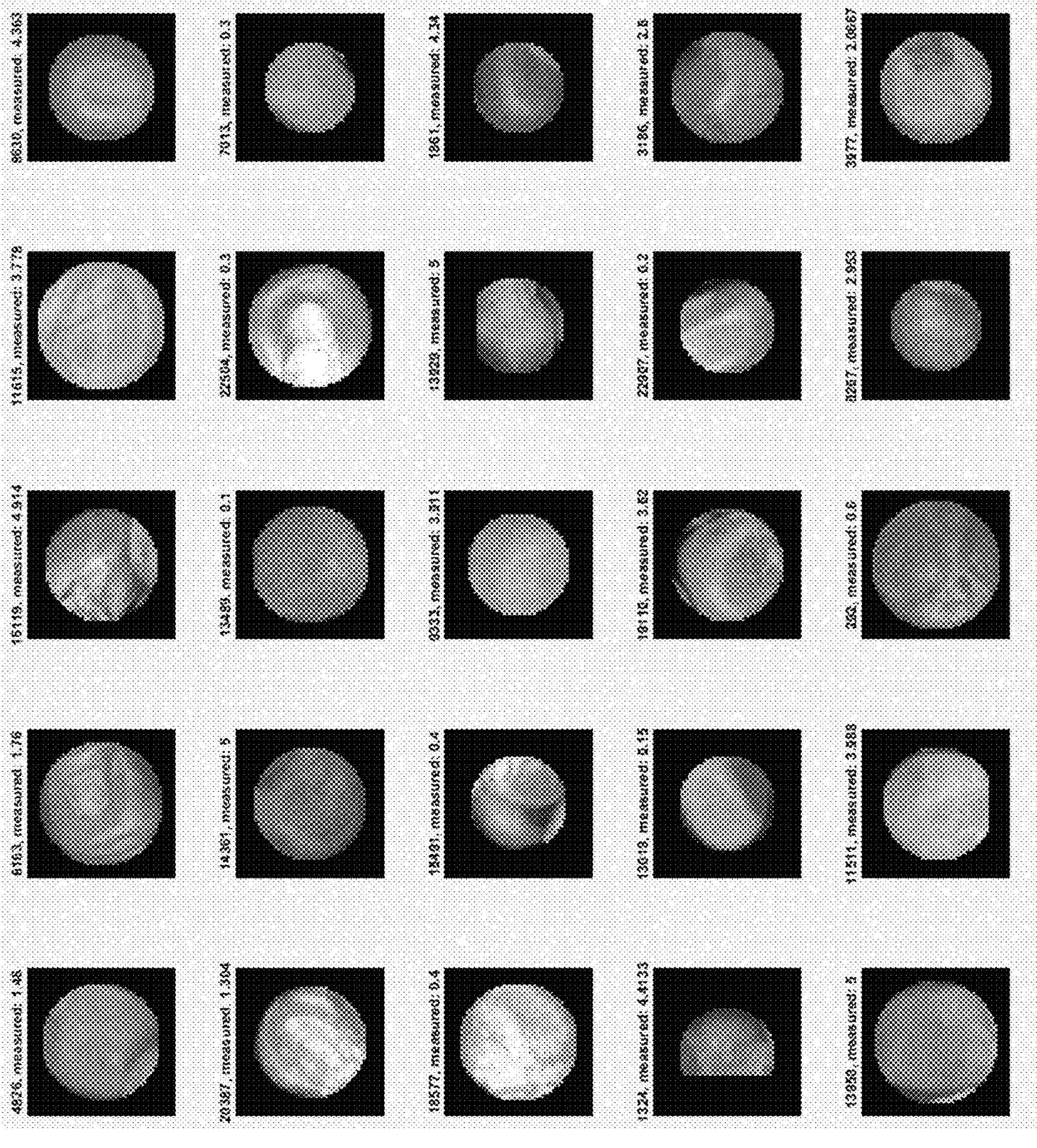
FIG. 3 is an illustration of seed portions for training the neural network with their attributed coverage values (labels) according to an example.

A plurality of such images is illustrated in FIG. 3. FIG. 3 illustrates 25 individual seed portion regions that have been extracted from initial images. These images are of seed regions with varying colour coating, coverage (thickness and percentage), lighting etc. In particular, these images are images of blue or red coatings on yellow corn. As is illustrated in this Figure, each image is associated with a value of coverage which has been assessed by visual inspection of the seeds (the number of the image appears alongside a value labelled "measured", where the measured value is a value of coverage which has been assessed by visual inspection of the seeds). The value may be provided as a general value of coverage of the seeds in the initial image having a plurality of seeds, and may apply to each extracted seed portion region extracted from the initial image (the same value attributed to the overall image may be applied to each seed portion). The value may be a value within a range. As an example, a value between 0 (fully coated) and 5 (no coating) may be assigned to each of the training images as an indication of the coverage of a coating on the seed. While it is not visible in these images, because they are black and white reproductions, these images (used in the methods) are colour images, so regions where the coating has been removed may appear as the colour of the underlying seed. In this particular example, the colour of the underlying seed (corn) is yellow, and the coating is either blue or red. Therefore, the proportion of yellow colour in the image to either red or blue colour may correlate to the coverage of coating on the seed. Thus, the proportion of the image which comprises a colour corresponding to a colour of an uncoated seed to the proportion of the image which comprises a colour corresponding to a coating applied to the seed may indicate the coverage of a coating on the seed (for example, this may be how the seeds are assessed visually, and the value associated with the training images may be determined using such analysis). It is noted that partial removal of the coating, e.g. a reduction (or increase) in the thickness of the coating, may result in a colour which lies between the colour of the coating and the underlying colour of the seed, or may be a different shade of the colour of the coating, and this intermediate colour or different shade of colour, associated with partial abrasion of the covering, may also be considered when generating a value associated with the coverage of a coating. The value associated with the coverage of a coating on a seed may therefore represent how much of the coating of the seed has been removed (or how much remains), from a value indicating no coverage to a value indicating full coverage. Full coverage may be where the seed is substantially entirely covered with a particular thickness of coating (within error). As an example, in a range of 0-5, a determined 50% coverage of the seed may be indicated by a value of 2.5. The value associated with the coverage of the coating may be an abrasion resistance score. For example, an abrasion resistance score of 2.5 may indicate a seed covered by approximately 50% of a coating. It will be appreciated that greyscale images may also be used in the methods described herein, where the relative darkness of regions in the image may indicate the coverage of the seed.

In an example, seeds with different colour coatings were used. In particular, seeds with blue coatings and red coatings were used, although it will be appreciated that coatings of other colours or only one colour may be used to train a neural network. Alternatively, a plurality of different colour seed coatings may be used to train the neural network. The use of seeds with different colour coatings produced a surprising effect, that the neural network was able to more accurately identify the coverage of seeds of a first colour when the neural network had been trained with seeds of both the first colour and a second colour, rather than when the neural network had been trained with seeds of only the first colour.

When discussing different colours, it may be assumed that each colour is defined by the corresponding wavelength interval in the visible light spectrum for each colour. For example, the colour "red" may be defined as having a wavelength interval of approximately 700-635 nm, "orange" as having a wavelength interval of approximately 635-590 nm, "yellow" as having a wavelength interval of approximately 590-560 nm, "green" as having a wavelength interval of approximately 560-520 nm, "cyan" as having a wavelength interval of approximately 520-490 nm, "blue" as having a wavelength interval of approximately 490-450 nm, and "violet" as having a wavelength interval of approximately 450-400 nm. When referring to "different colours", the colours may be colours attributed to different wavelength intervals. Alternatively, the "different colours" or "different shades of a colour" may be colours in the same wavelength interval with different wavelengths.

The images of regions/portions of seeds may be used as input to the trained neural network or for training of the neural network. It will be appreciated that the initial images with a plurality of seeds may as an alternative be used as input to the trained neural network or to train the neural network, rather than the individual seed images. However, by extracting individual seeds for input, the number of training data for the neural network is increased, and therefore the likelihood of training the neural network to a higher degree of accuracy is increased.

To train the neural network, the training images (which comprise the images of individual seeds in this example) described above are input to the neural network. The values of coverage attributed to each image (e.g. the values determined by visual inspection) may also be used in the neural network, for example, as labels of the images. The neural network may process the images to estimate a value of coverage associated with the image. For example, given a training dataset such as the training images, a forward pass may sequentially compute the output in each layer and propagate the function signals forward through the network. In the final output layer, an objective loss function may measure error between the inferenced outputs and the given labels (e.g. the values of coverage which are attributed to the training images). To minimize the training error, the backward pass may use the chain rule to backpropagate error signals and compute gradients with respect to all weights throughout the neural network. The weight parameters may then be updated using optimization algorithms based on stochastic gradient descent (SGD).

The neural network may be a convolutional neural network (CNN). The neural network may be a deep neural network (DNN). The neural network may comprise a plurality of layers (an array of layers). For example, the neural network may comprise an input layer, a 2D convolution layer, a batch normalization layer, a ReLU layer, a max pooling layer, a fully connected layer and an output layer, for example, a regression layer. The neural network may comprise any of these layers, with any number in any appropriate order between the input and output layers. The input to the neural network may be the images described above, and the output may be a value associated with the coverage of a coating on a seed, such as the abrasion resistance of the coating, the percentage coverage or the uniformity of the thickness of the coating. The neural network may comprise a set of options for training using stochastic gradient descent with momentum. Once training is finished, the model may be re-optimized with a new set of options. For example, an initial learning rate may be set to change less in response to the estimated error each time the model weights are updated in the optimization step.

An example neural network for use in the method is outlined below.

The neural network may comprise an input layer for inputting 2D images to a network and applying data normalization. The image input layer may be created for a colour image (e.g. an RGB image) based on the resolution of the image. For example, for a colour image with a resolution of 100×100 each having 3 RGB values, an input layer may comprise 100×100×3 (30,000) neurons.

The neural network may also comprise a first 2D convolutional layer which applies sliding convolutional filters to the input. The layer convolves the input by moving the filters along the input vertically and horizontally and computing the dot product of the weights and the input, and then adding a bias term.

The neural network may also comprise a first batch normalization layer which normalizes each input channel across a mini-batch. The use of a batch normalization layer between layers may speed up training of convolutional neural networks and reduce the sensitivity to network initialization. The batch normalization layer first normalizes the activations of each channel by subtracting the mini-batch mean and dividing by the mini-batch standard deviation. Then, the layer shifts the input by a learnable offset 13 and scales it by a learnable scale factor $\gamma$.

The neural network may also comprise a first ReLU layer which performs a threshold operation to each element of the input, where any value less than zero is set to zero.

The neural network may also comprise a max pooling layer which performs down-sampling by dividing the input into rectangular pooling regions, and computing the maximum of each region. As an example, the max pooling layer may have a pool size [2 2] and a stride [2 2] (where stride is the step size for traversing the input vertically and horizontally, specified as a vector of two positive integers [a b], where a is the vertical step size and b is the horizontal step size).

The neural network may further comprise a second 2D convolutional layer which is similar in configuration to the first layer, except the number of layers may be doubled.

The neural network may also comprise a second batch normalization layer, a second ReLU layer, a second max pooling layer, a third batch normalization layer and a third ReLU layer.

The neural network may also comprise a first fully connected layer which multiplies the input by a weight matrix and then adds a bias vector. The output size may be specified for the fully connected layer. As an example, the output size may be the same size as the second or third convolutional 2D layer.

The neural network may comprise a fourth ReLu layer and a second fully connected layer. The size of the second fully connected layer may be 1 (for example, there may be one value output from the second fully connected layer). The output of the second fully connected layer may be a value associated with the coverage of a coating of a seed (e.g. abrasion resistance) shown in the input image.

The neural network may also comprise a regression layer which computes the half-mean-squared-error loss for regression problems.

A set of options for training the neural network using stochastic gradient descent with momentum may be determined. For example, the number of epochs (an epoch corresponding to a full pass of the data) may be set to 250. The execution environment, or the hardware resource for training network, may use a local or remote parallel pool. For example, the calculations/modelling and software developments may be performed using parallel computation on a computer with a plurality of GPUs and CPUs, such as 4 GPUs and 12 CPUs. The training data may also be split into small batches (minibatches), for example with a size 100, at a time in each epoch. The initial learning rate (how much the model is changed in response to the estimated error each time the model weights are updated) may be set, for example to a value of 0.001. Regularization may be used to improve the performance of the model. The regularization factor may be set to 0.004. Data may be shuffled before each training epoch and before each network validation. Validation data may be used during training to validate the neural network. The validation accuracy and validation loss on the validation data may be calculated during training. The validation data may be the images with their corresponding values of coverage set aside from the training data (validation images set apart from the training images). The number of times that the loss on the validation set can be larger than or equal to the previously smallest loss before network training stops may be set at 7. A plot of training progress may be made during training.

The validation data (data, for example images, that have not been used to train the neural network) may be used to evaluate how well the neural network is assessing the coverage of seeds. To perform the evaluation, validation data is input to the trained neural network and the neural network outputs a value of coverage or abrasion resistance of the seed. Then the evaluation may be performed by comparing values of abrasion resistance/coverage determined by the trained neural network with the visually determined values of abrasion resistance/coverage. The validation of the neural network may involve calculating the root-mean-square error (RMSE) of the visually determined values of coverage and the values of coverage predicted by the neural network. The trained neural network with the lowest RMSE is the neural network with the optimum options and architecture. Various configurations of the neural network may be implemented, and the trained neural network with the lowest RMSE may be selected as the trained neural network for use in the method.

Once training of the neural network is finished, the model may be re-optimized. Bayesian optimization may be performed by minimizing the classification error on the validation set in order to select and tune the architecture and options of the neural network. A different set of options may be implemented. For example, the set of options may generally use the same values as is described in the example above, or different values may be used. For example, the initial learning rate may be decreased by a factor of 10, to 0.0001. By reducing the initial learning rate during re-optimization, the model may be changed less in response to the estimated error each time the model weights are updated, and therefore, the resulting values indicating coverage of a seed may be refined. Validation of the model using validation data (the same as that described above or different validation data) may be performed to evaluate the performance of the model, for example, to determine the accuracy of the model.

The neural network outlined above comprises architecture and options that were determined by the inventors to be particularly efficient in calculating the coverage of a coating on the seed.

In an example, more than 500 images of coated, abraded and raw corn seeds (with varying quality, resolution and light intensity) were collected for use as training images (Table 1) and used to train the neural network. In addition, around 10% of the images (46 images) were used as validation images (27 images for red coating and 16 images for blue coating). Each of these images were visually inspected to assign a value to each image indicating the amount of coating on the seed, or the abrasion resistance of the coating.

TABLE 1

| | Images of coated seeds | Images of abraded seeds | Images of raw seed |
|---|---|---|---|
| Corn (red coat) | 112 | 224 | 22 |
| Corn (blue coat) | 82 | 164 | 22 |

Figure 4:
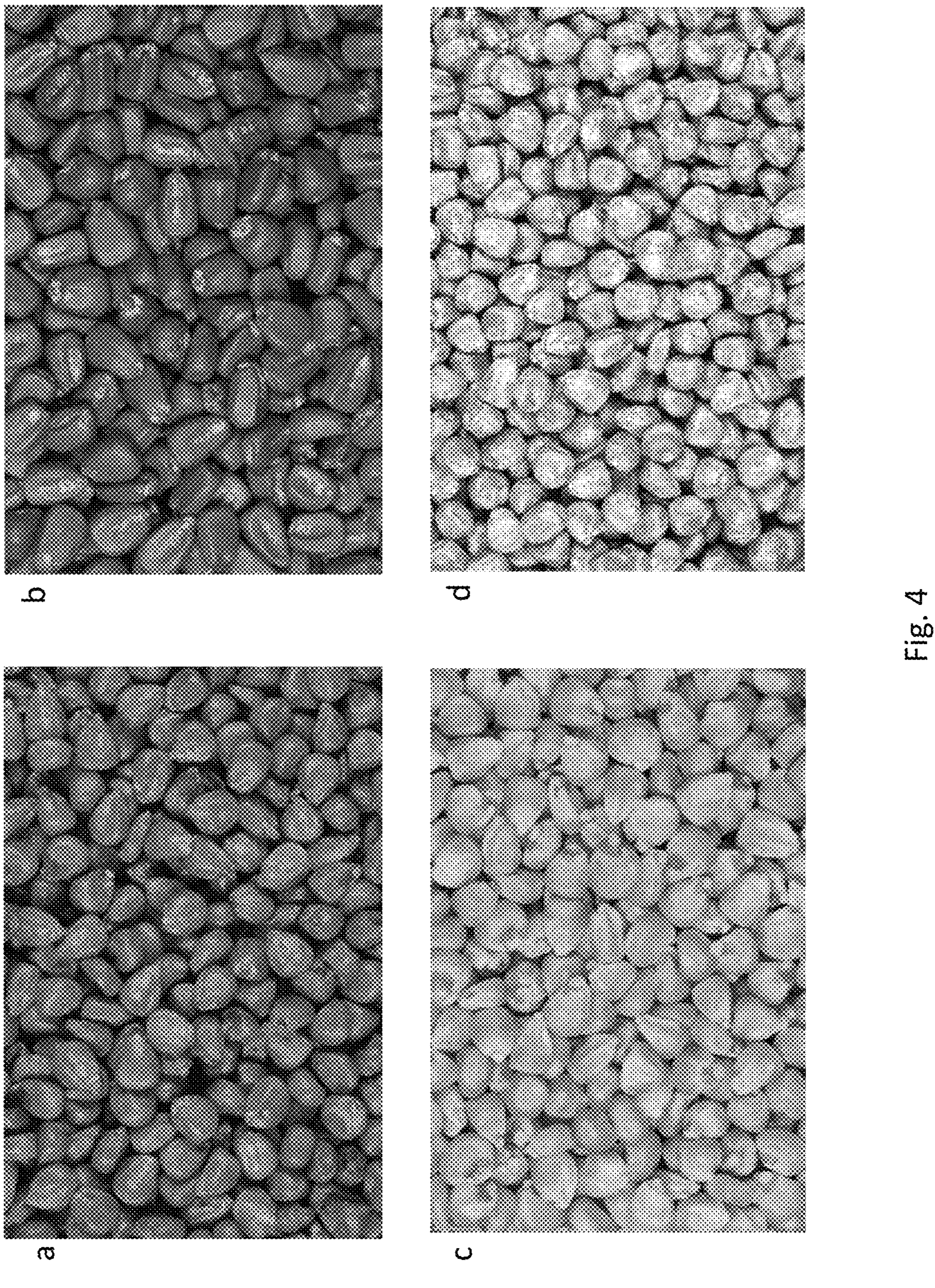
FIG. 4 is an illustration of images used for validation of the neural network.

Thus, around 50 images were selected for the validation of the trained neural network. FIG. 4 illustrates example validation images to be evaluated of corn (which is yellow in colour). FIG. 4*a*) illustrates seeds coated with a red coating. The seeds in this image have been exposed to mechanical stress and therefore comprise red regions of varying shades and yellow regions of varying shades. FIG. 4*b*) illustrates seeds coated with a red coating which have not been exposed to mechanical stress, and therefore generally comprise the same shade of red coating. FIG. 4*c*) illustrates seeds with no coating (raw seeds) and therefore are yellow. 4*d*) illustrates seeds coated with a blue coating. The seeds in this image have been exposed to mechanical stress and therefore comprise blue regions of varying shades and yellow regions of varying shades. Each individual seed is given a value associated with the coverage of a coating on the seed by the neural network and the average is presented as the final score of abrasion resistance. Table 2 below outlines for each image 4(*a*) to 4(*d*) the abrasion resistance determined by visual inspection of the seeds, and the abrasion resistance determined by the trained neural network. The values correlate within an acceptable margin.

TABLE 2

| Image to be evaluated (from validation set) | Abrasion resistance determined by visual inspection | Abrasion resistance distinguished by the model |
|---|---|---|
| a | 3.39 | 3.08 |
| b | 0.25 | 0.6 |
| c | 5 | 4.98 |
| d | 3.48 | 3.2 |

Figure 5:
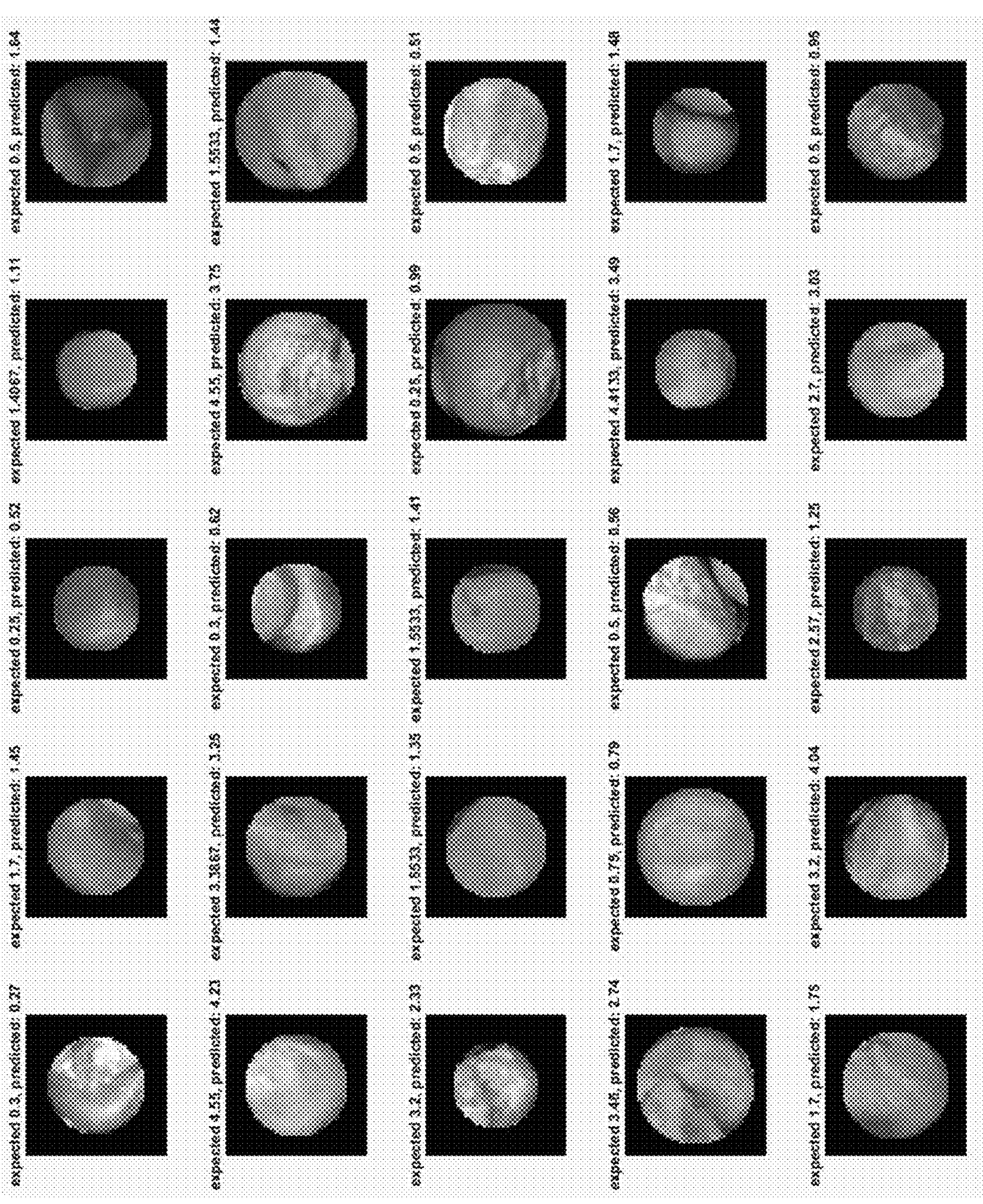
FIG. 5 is an illustration of seed portions for validation of the neural network with their attributed coverage values and predicted values generated by the neural network.
Figure 6:
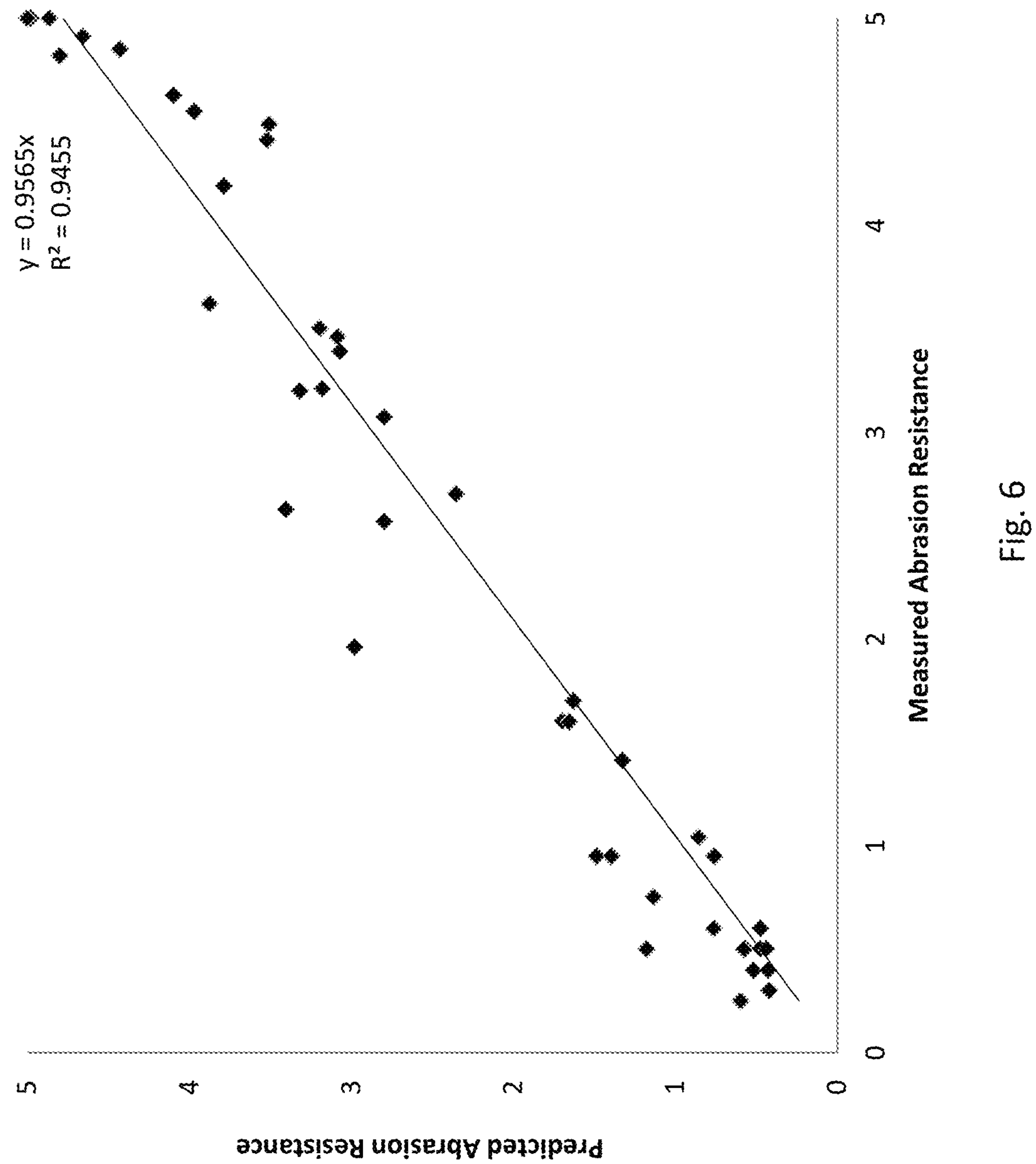
FIG. 6 is a graph illustrating the correlation between the attributed coverage values and predicted values generated by the neural network.
Figure 7:
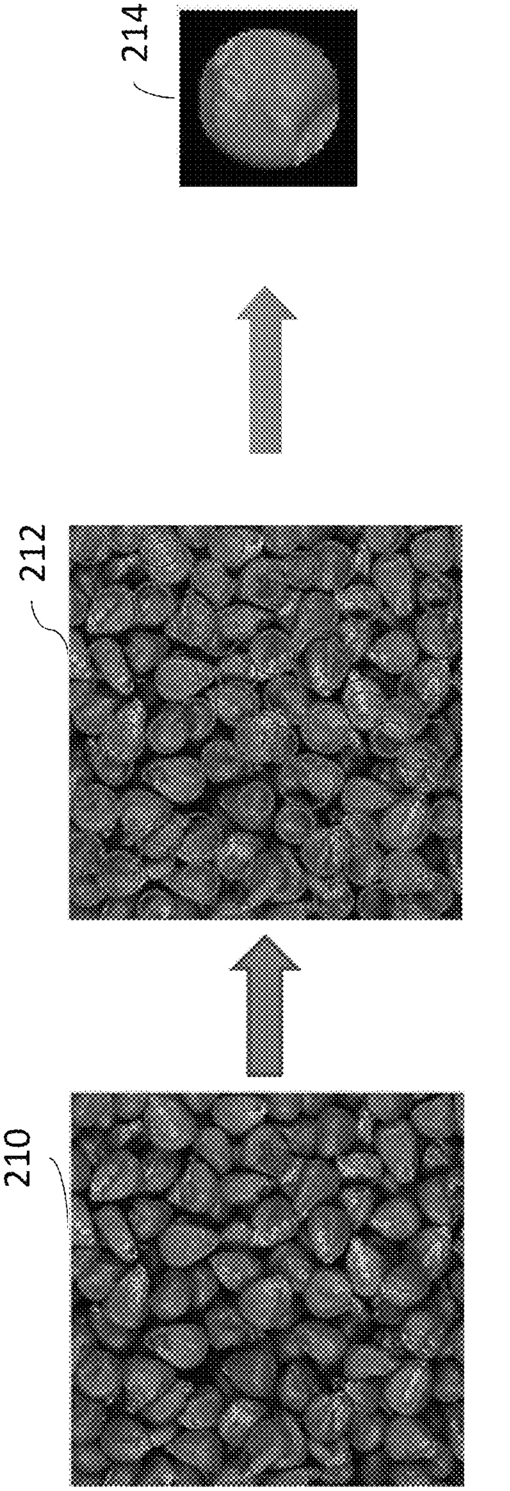
FIG. 7 is a colour version of FIG. 2.
Figure 8:
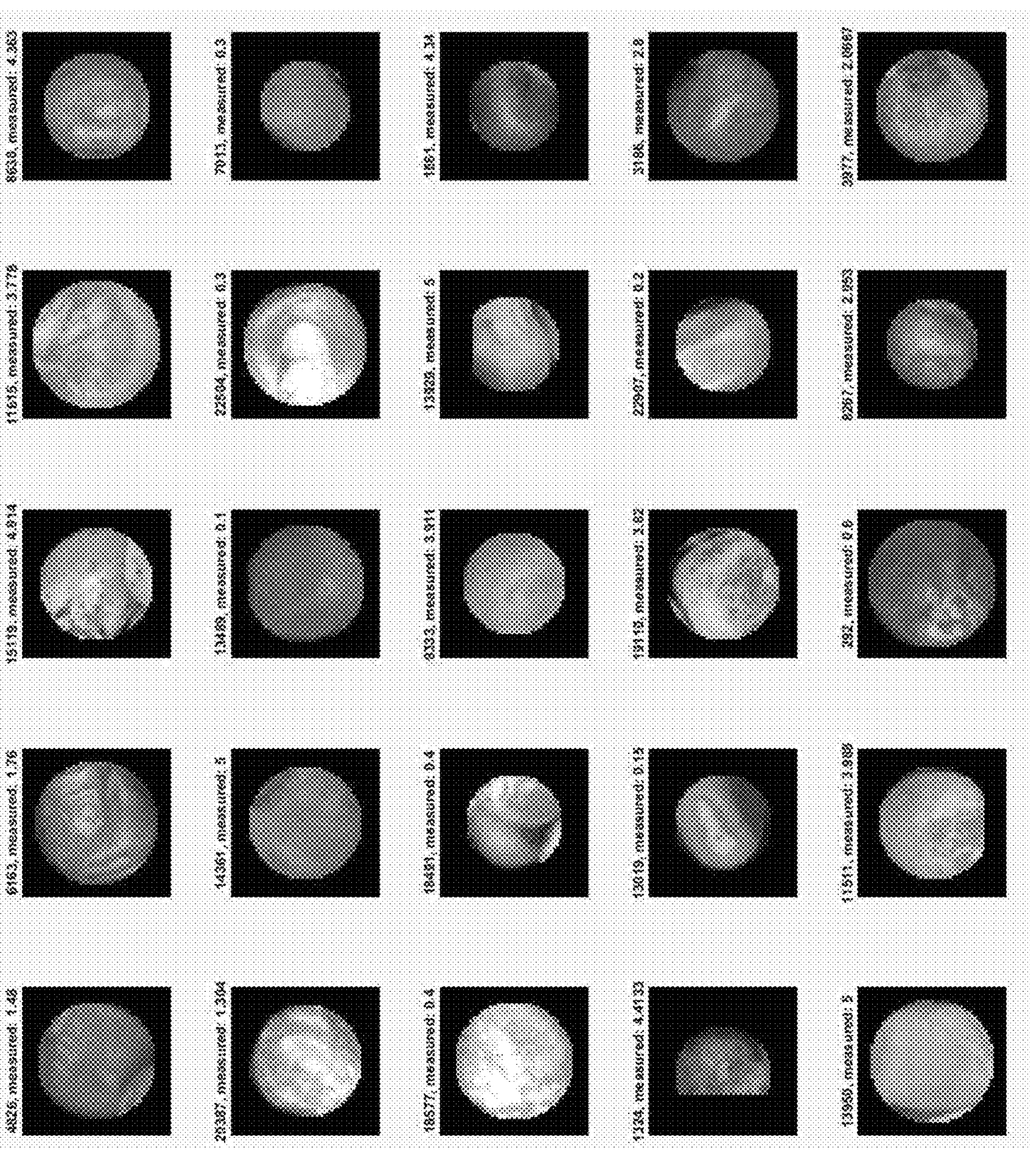
FIG. 8 is a colour version of FIG. 3.
Figure 9:
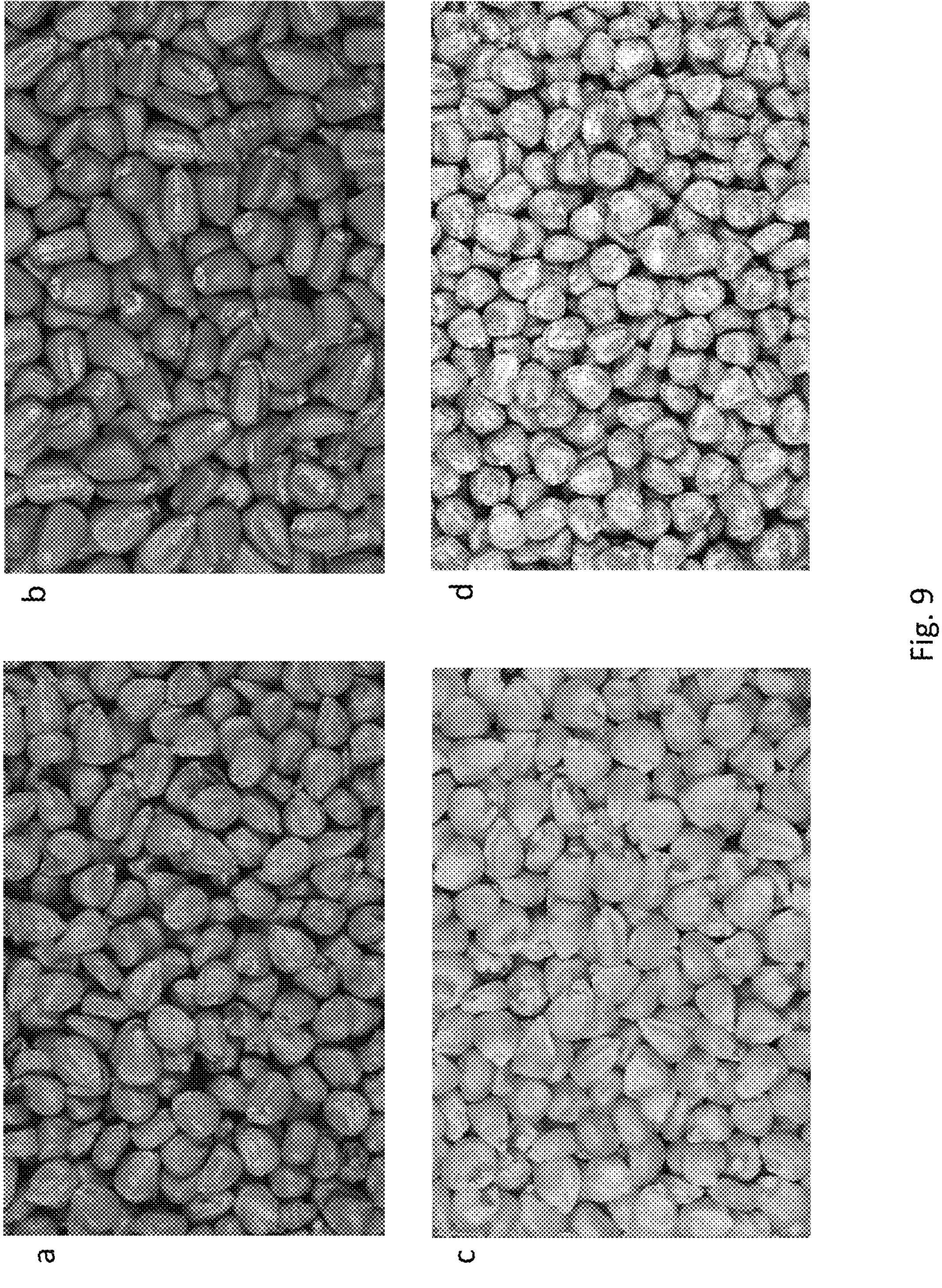
FIG. 9 is a colour version of FIG. 4.
Figure 10:
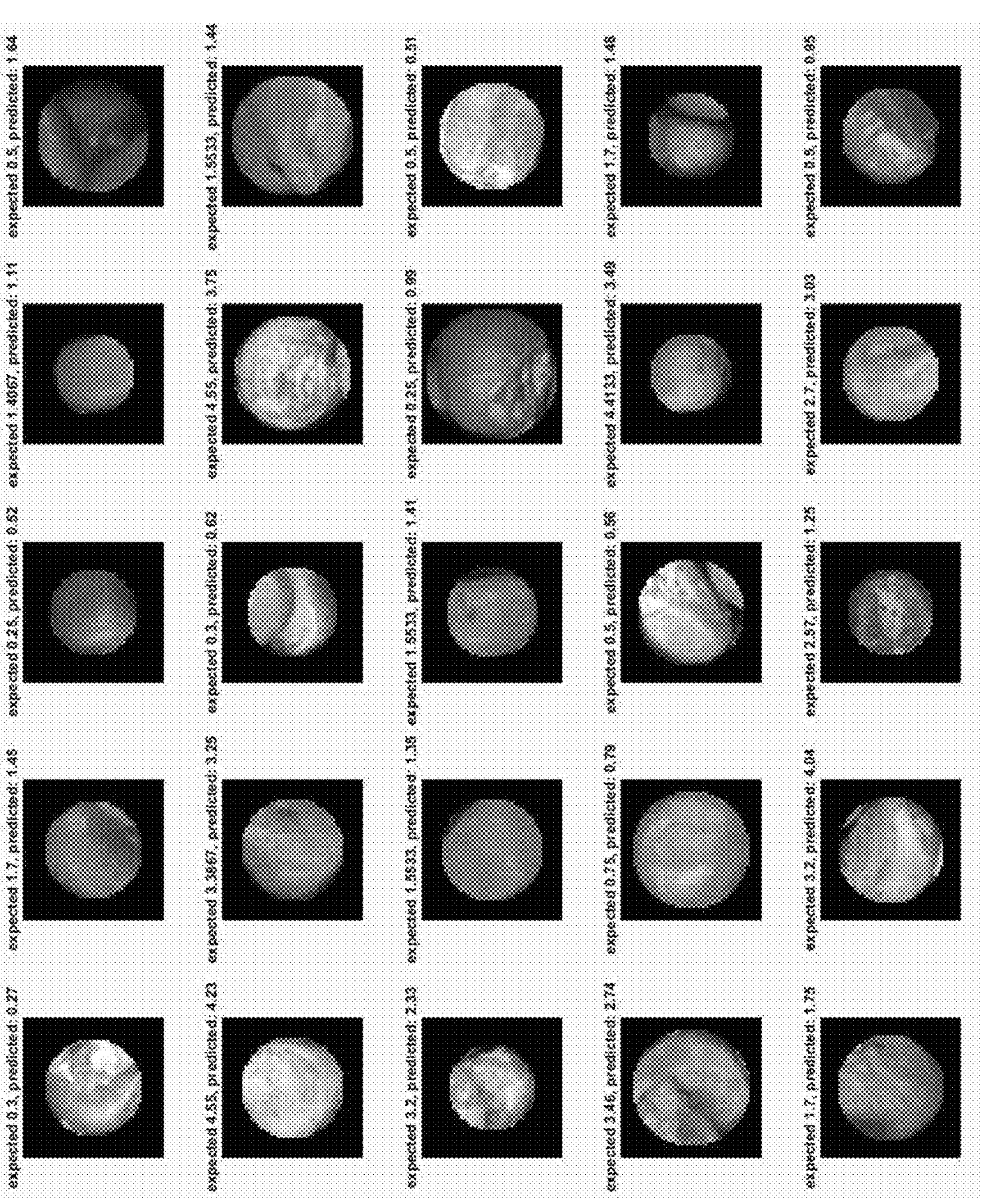
FIG. 10 is a colour version of FIG. 5.

FIG. 5 illustrates examples of 25 seed portions extracted from images with their visually determined abrasion resistance (labelled "expected") and abrasion resistance predicted by the trained neural network (labelled "predicted"). FIG. 5 illustrates seed regions with varying colour coating, coverage (thickness and percentage), lighting etc. In particular, these images are images of blue or red coatings on yellow corn. FIG. 6 illustrates a plot of the predicted abrasion resistance against the measured abrasion resistance for the images used for validation, including the seeds shown in FIG. 5. The correlation between the measured and predicted abrasion resistance in this example is 0.9455. More specifically, the correlation for red coatings is 0.91 and for blue coatings is 0.98. It is therefore evident that the trained neural network can perform a sufficiently accurate assessment of abrasion resistance.

FIGS. 7-10 are colour versions of FIGS. 2-5 respectively.

In any of the above aspects, the various features may be implemented in hardware, or as software modules running on one or more processors. Features of one aspect may be applied to any of the other aspects.

The disclosure also provides a computer program or a computer program product for carrying out any of the methods described herein, and a computer readable medium having stored thereon a program for carrying out any of the methods described herein. A computer program embodying the disclosure may be stored on a computer-readable medium, or it could, for example, be in the form of a signal such as a downloadable data signal provided from an Internet website, or it could be in any other form.

A computing device, such as a data storage server, may embody the present disclosure, and may be used to implement a method of an embodiment of the disclosure. The computing device may comprise a processor and memory. The computing device may also include a network interface for communication with other computing devices, for example with other computing devices of disclosure embodiments.

For example, an embodiment may be composed of a network of such computing devices. The computing device may also include one or more input mechanisms such as keyboard and mouse, and a display unit such as one or more monitors. The components may be connectable to one another via a bus.

The memory may include a computer readable medium, which may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor may be is configured to control the computing device and execute processing operations, for example executing code stored in the memory to implement the various methods described here and in the claims. The memory may store data being read and written by the processor. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit may display a representation of data stored by the computing device and may also display a cursor and dialog boxes and screens enabling interaction between a user and the programs and data stored on the computing device. The input mechanisms may enable a user to input data and instructions to the computing device.

The network interface (network I/F) may be connected to a network, such as the Internet, and may be connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

The embodiments of the present disclosure and the various features and advantageous details thereof are explained more fully with reference to the non-limiting examples that are described and/or illustrated in the drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which the embodiments of the present disclosure belong. Preferred methods, devices, and materials are described, although any methods and materials similar or equivalent to those described herein may be used in the practice or testing of the embodiments.

Although only a few exemplary embodiments have been described in detail above, those skilled in the art will readily appreciate that many modifications are possible in the exemplary embodiments without materially departing from the novel teachings and advantages of the embodiments of the present disclosure. The above-described embodiments of the present disclosure may advantageously be used independently of any other of the embodiments or in any feasible combination with one or more others of the embodiments Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements. In a device or apparatus claim enumerating several means, several of these means may be embodied by one and the same item of hardware. The mere fact that certain measures are recited in mutually different dependent claims does not indicate that a combination of these measures cannot be used to an advantage.

The invention claimed is:

1. A method for processing images of seeds, the method comprising:

inputting a seed image comprising at least a portion of a seed to a trained neural network to generate a value associated with a quality or a non-binary degree of coverage of a coating on the seed, the trained neural network having been trained to generate the value associated with the quality or the non-binary degree of the coverage of the coating on the seed using a plurality of training images each comprising at least a portion of a training seed, and wherein each training image is labelled with a value associated with a quality or a non-binary degree of a coverage of a coating on the training seed, wherein a plurality of seed images generated from a same image or taken from a same sample are input to the trained neural network to generate a plurality of values associated with qualities or non-binary degrees of the coverage of coatings corresponding to the plurality of seed images, and an average of the plurality of values is taken.

2. The method as claimed in claim 1, wherein the value associated with the quality or the non-binary degree of the coverage of the coating on the seed and/or a training seed indicates a resistance of the coating to abrasion.

3. The method as claimed in claim 1, wherein the value associated with the quality or non-binary degree of the coverage of the coating on the seed and/or the training seed indicates at least one of: a percentage of a seed surface covered in a coating; or a uniformity of the coverage of the coating on the seed and/or the training seed.

4. The method as claimed in claim 1, wherein the method further comprises the step of training the neural network.

5. The method as claimed in claim 1, wherein the trained neural network is trained using first training images of training seeds comprising a coating of a first colour, and using second training images of training seeds comprising coatings of a second colour.

6. The method as claimed in claim 5, wherein inputting the seed image comprises inputting a seed image of a seed comprising a coating of the first colour.

7. The method as claimed in claim 1, wherein the seed image is generated by extracting a region of a seed from an image comprising a plurality of seeds.

8. The method as claimed in claim 7, wherein the region of the seed is extracted using an algorithm to detect circles in images to detect an area within the seed, where the area within the seed is then extracted.

9. The method as claimed in claim 1, wherein each training image is generated by extracting a region of a training seed from an image comprising a plurality of training seeds.

10. The method as claimed in claim 9, wherein the region of the training seed is extracted using an algorithm to detect circles in images to detect an area within the training seed, where the area within the training seed is then extracted.

11. The method as claimed in claim 1, wherein the neural network is at least one of: a convolutional neural network; or a deep neural network.

12. The method as claimed in claim 1, wherein the neural network comprises at least one of each of: an input layer, a 2D convolution layer, a batch normalization layer, a ReLU layer, a max pooling layer, a fully connected layer, or a regression layer.

13. A non-transitory computer-readable medium storing a computer program which, when executed by a computing system comprising processor hardware and memory hardware, causes the processor hardware to perform the method as claimed in claim 1.

14. An apparatus comprising processor hardware and memory hardware, the memory hardware storing processing instructions which, when executed by the processor hardware, cause the processor hardware to perform the method as claimed in claim 1.

15. A method for processing images of seeds, the method comprising:

inputting a seed image comprising at least a portion of a seed to a trained neural network to generate a value associated with a quality or a non-binary degree of coverage of a coating on the seed, the trained neural network having been trained to generate the value associated with the quality or the non-binary degree of the coverage of the coating on the seed using a plurality of training images each comprising at least a portion of a training seed, and wherein each training image is labelled with a value associated with a quality or a non-binary degree of a coverage of a coating on the training seed, wherein the trained neural network is trained using first training images of training seeds comprising a coating of a first colour, and using second training images of training seeds comprising coatings of a second colour.

* * * * *